United States Patent
Shivanna (10) Patent No.: US 11,637,842 B2
(45) Date of Patent: Apr. 25, 2023

(54) DETECTION OF SECURITY INTRUSION IN A COMPUTING SYSTEM

(71) Applicant: HEWLETT PACKARD ENTERPRISE DEVELOPMENT LP, Houston, TX (US)

(72) Inventor: Suhas Shivanna, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 348 days.

(21) Appl. No.: 16/779,516

(22) Filed: Jan. 31, 2020

(65) Prior Publication Data

US 2021/0243206 A1  Aug. 5, 2021

(51) Int. Cl.
*H04L 9/00* (2022.01)
*H04L 9/40* (2022.01)
*G06F 21/55* (2013.01)
*H04L 41/0631* (2022.01)
*G06F 11/30* (2006.01)

(52) U.S. Cl.
CPC ...... *H04L 63/1416* (2013.01); *G06F 11/3006* (2013.01); *G06F 21/552* (2013.01); *H04L 41/0631* (2013.01); *H04L 63/08* (2013.01); *H04L 63/1433* (2013.01); *H04L 63/20* (2013.01)

(58) Field of Classification Search
CPC ............. H04L 63/1416; H04L 63/1433; G06F 11/3006; G06F 21/552
See application file for complete search history.

(56) References Cited

U.S. PATENT DOCUMENTS

| 7,437,752 | B2* | 10/2008 | Heard | H04L 63/101 |
| | | | | 380/247 |
| 8,839,435 | B1* | 9/2014 | King | H04L 63/1425 |
| | | | | 726/22 |
| 10,084,807 | B2 | 9/2018 | Most et al. | |
| 10,242,176 | B1* | 3/2019 | Sathyanarayana | G06F 13/36 |
| 2011/0185055 | A1* | 7/2011 | Nappier | H04L 63/1433 |
| | | | | 709/224 |
| 2016/0217283 | A1* | 7/2016 | Liu | G06F 21/572 |
| 2018/0276383 | A1 | 9/2018 | Venkataramani | |
| 2021/0243208 | A1* | 8/2021 | Rubin | G06F 21/554 |

OTHER PUBLICATIONS

Milajerdi et al., "HOLMES: Real-time APT Detection through Correlation of Suspicious Information Flows", IEEE Symposium on Security and Privacy (SP), May 19-23, 2019, 16 pages.
Monshizadeh et al., "MACE: Detecting Privilege Escalation Vulnerabilities in Web Applications", Proceedings of the 2014 ACM SIGSAC Conference on Computer and Communications Security, Nov. 3-7, 2014, 12 pages.
Syslog-Ng Store Box, "High Performance, Enterprise-class Log Management Appliance", available online at <https://web.archive.org/web/20180731171143/https://www.syslog-ng.com/products/log-management-appliance/>, Jul. 31, 2018, 13 pages.

* cited by examiner

*Primary Examiner* — Christopher J Brown
(74) *Attorney, Agent, or Firm* — Trop, Pruner & Hu, P.C.

(57) ABSTRACT

Some examples relate to detecting a security intrusion in a computer system. In an example, the detection of the security intrusion may be performed by analyzing a plurality of log records generated corresponding to a plurality of milestone actions performed during invocation of an operation on the computing system, based on a rule-set. Upon detection of a deviation in the plurality of log record from the rule-set, a security action is performed.

20 Claims, 4 Drawing Sheets

DETECTION OF SECURITY INTRUSION IN A COMPUTING SYSTEM

BACKGROUND

Enterprises may use a wide array of computing systems, for example, servers, for their operational needs. The computing systems may use different operating systems and run a variety of computer applications, which may provide various services to customers. Ensuring efficient and secure running of the computing systems may be considered a reasonable expectation from a business's point of view.

BRIEF DESCRIPTION OF THE DRAWINGS

For a more complete understanding of various examples, reference is now made to the following description taken in connection with the accompanying drawings.

DETAILED DESCRIPTION

The following detailed description refers to the accompanying drawings. Wherever possible, same reference numbers are used in the drawings and the following description to refer to the same or similar parts. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

The terminology used herein is for the purpose of describing particular examples and is not intended to be limiting. As used herein, the singular forms "a," "an," and "the" are intended to include the plural forms as well, unless the context clearly indicates otherwise. The term "another," as used herein, is defined as at least a second or more. The term "coupled," as used herein, is defined as connected, whether directly without any intervening elements or indirectly with at least one intervening element, unless indicated otherwise. For example, two elements can be coupled mechanically, electrically, or communicatively linked through a communication channel, pathway, network, or system. The term "and/or" as used herein refers to and encompasses any and all possible combinations of the associated listed items. It will also be understood that, although the terms first, second, etc., may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

Depending on the requirements, enterprises may deploy a variety of computing systems, including servers. Secure running of computing systems may be considered a basic expectation from an organization's perspective considering that their business credibility may rely on it. Generally, security measures and tools may be configured to prevent and detect potential security breaches (or security attacks). However, in the present day digital world, detecting and addressing security attacks in computing systems are major challenges. Individuals, for example, unauthorized users (or hackers) may take advantage of vulnerabilities or misconfigurations of the operating systems in computing systems to breach the computing systems. As used herein, the term "vulnerability" may refer to include a weakness in a computing system which may be exploited to perform an unauthorized action within the computing system. Seemingly, vulnerabilities e.g., security vulnerabilities of a computing system, and their exploitation are the root cause of the most security attacks.

A security attack may occur when an unauthorized user manages to perform operations on a computing system compromising confidentiality, integrity and availability of the computing system. In order to perform an operation, the unauthorized user may, first, intrude into the computing system and then performs an operation on the computing system. Intrusion into the computing system may be performed by various ways e.g., manipulating or bypassing security mechanism exploiting a security vulnerability. In some examples, a security attack in a computing system may occur due to authentication bypass, which involves bypassing authentication process exploiting a security vulnerability e.g., a buffer overflow vulnerability. A buffer overflow vulnerability occurs due to improper input validation when large data is given to a program in a computing system. The excess data corrupts nearby space in memory, and may alter other data and be used to perform unauthorized actions. In some other examples, a security attack may occur due to privilege escalation attack exploiting coding errors or other vulnerabilities. Such security attacks may cause havoc to the security of the system and breach to business processes or data (e.g., customer data) of an enterprise, which may not only damage its business but may also, in some scenarios, impact its credibility and customer trust.

Mechanisms described herein relate to an intrusion detection functionality that may prevent a security attack in a computing system. In particular, the intrusion detection functionality may prevent a security attack intended to modify security configuration of a computing system. As used herein, the term "intrusion detection functionality" may refer to a functionality that may enable detection of a security intrusion in a computing system. The term, "security intrusion" as used herein, may refer to an unauthorized access into a computing system. In an example, the security intrusion may occur when an unauthorized attempt may be made to manipulate or bypass the security mechanisms of the computing system.

In examples described herein, the intrusion detection functionality may enable detection of a security intrusion caused by authentication bypass exploiting a security vulnerability e.g., the buffer overflow vulnerability in a computing system. In some examples, the intrusion detection functionality may enable the detection of a security intrusion caused by privilege escalation.

The described mechanisms provide systems and techniques that employ secure log store that may be stored in machine-readable storage medium e.g., Random Access Memory (RAM) of the computing system. The secure log store may store log records generated corresponding to milestone actions performed during invocation of operations on the computing system. Each log record may include information related to the corresponding milestone action with a time stamp. Real-time monitoring and analysis of the log records may enable to detect security intrusions by identifying (i) whether an operation (that is invoked) is invoked by an unauthorized user by bypassing an authentication process in the computing system and/or (ii) an anomaly in the process of invoking (i.e., invocation process) the operation on the computing system. On detecting the security intrusion, a security action e.g., a recovery action may be taken to recover the management system before the operation is committed on the computing system. Accordingly, the described systems and techniques help in avoiding a security attack by detecting the security intrusion before the operation performs (i.e., runs) on the computing system, and thus improve the security of the computing system.

As used herein, the term "milestone action" may refer to a predefined action that corresponds to a checkpoint in a code path during an operation performed on a computing system. In an example, the milestone action may refer to a predefined action corresponding to a checkpoint in a code path during invocation of an operation on a computing system. In some examples, the milestone action may correspond to entry and exit of the code path during the operation. In some examples, the milestone action may correspond to initiation or completion of an event carried out for verifying various details such as user identification, user password, presence of users in a blacklist repository, during an authentication process performed on the computing system.

In some examples, the mechanisms described herein provide real-time detection of security intrusions in computing systems. Real-time detection may mean that the security intrusion may be detected on a real-time basis i.e., during an attempt of intrusion. In some other examples, the mechanisms described herein may provide off-line detection of a security intrusion by periodically monitoring and analyzing the log records stored in the secure log store.

As described herein, the present subject matter provides systems and techniques that may enhance overall security of the computing systems and help to protect the products from unknown vulnerabilities caused due to various design and coding defects.

In some examples, the computing system may include, without limitation, a server, a desktop computer, a laptop, a tablet computer, a mobile device, a personal digital assistant (PDA), an embedded system, a management system, a switch, a router, or a workstation. In an example, the computing system may be a part of a datacenter. As used herein, the term "server" may include a computer (e.g., hardware) and/or a computer program (machine-readable instructions) that may process requests from other (client) computers over a network. In some examples, the computing system may be a management system capable of managing and monitoring the computing system. An examples of the management system may include a management controller such as a server management controller or a storage management controller. The management controller may be an autonomous computer subsystem that provides, for example, management and monitoring capabilities independently of central processing unit (CPU), firmware and operating system of the computing system. In an example, a management controller such as a baseboard management controller (BMC) may be implemented in a computing system e.g., a server.

In some examples, the intrusion detection functionality (as described above) in a computing system may be enabled by an intrusion detection engine. Accordingly, in some examples, an intrusion detection engine capable of detecting a security intrusion in a computing system is presented. In an example, the intrusion detection engine may be implemented in a computing system to detect a security intrusion in the computing system. In some examples, the intrusion detection engine is separate from Central Processing Unit (CPU) of the computing system. In some examples, the intrusion detection engine may be implemented in a management system of a computing system e.g., a server.

The described systems and methods may be utilized for detecting security intrusions in various computing systems. Although the description herein is presented for detecting a security intrusion in a management system e.g., a management controller of a computing system, the methods and described techniques may be implemented for other devices, albeit with a few variations. Various implementations of the present subject matter have been described below by referring to several examples.

The above systems and methods are further described with reference to FIGS. 1-4. It should be noted that the description and figures merely illustrate the principles of the present subject matter along with examples described herein and, should not be construed as a limitation to the present subject matter. It is thus understood that various arrangements may be devised that, although not explicitly described or shown herein, embody the principles of the present subject matter. Moreover, all statements herein reciting principles, aspects, and embodiments of the present subject matter, as well as specific examples thereof, are intended to encompass equivalents thereof.

Figure 1:
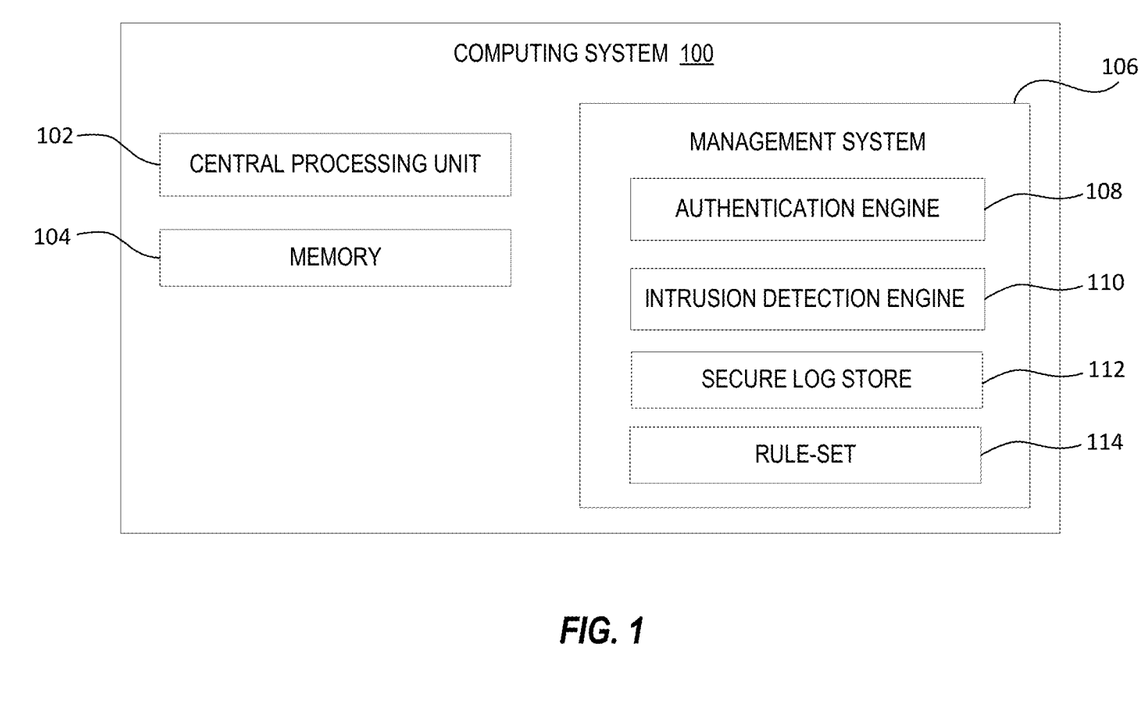
FIG. 1 is a block diagram of an example computing system including an intrusion detection engine capable of detecting a security intrusion in a management system of the computing system.

FIG. 1 depicts block diagram of an example computing system 100 e.g., a server. The computing system 100 includes a management system 106 that includes an intrusion detection engine 110 capable of detecting a security intrusion in the management system 106 by a user. The computing system 100 includes at least one central processing unit (CPU) 102 and a memory 104. The computing system 100 may further include other components e.g., graphics processing unit (GPU), application-specific integrated circuit (ASIC), a field programmable gate array (FPGA), other hardware devices (capable of retrieving and executing various instructions stored in the memory 104 that are required for the computing system 100 to perform desired functions.

The management system 106 may be capable of managing and monitoring the computing system 100. The management system 106 can be implemented using a separate processor from the CPU 102 that is used to execute a high level operating system. Management system 106 may be used for out-of-band management of the computing system 100 and monitoring of its operation. In an example, management system 106 may provide a mechanism to manage computer system 100 by using a dedicated network connection to the management hardware rather than to an operating system or login shell. In an example, management system 106 may be a management controller e.g., a baseboard management controller (BMC).

The Operating System (OS) is a system software that manages hardware and software resources of a computing system e.g., the computing system 100 and provides common services for computer programs. The OS can be executable on CPU 102 and loaded to the memory 104. The OS may be a high level OS such as LINUX, WINDOWS, UNIX, a bare metal hypervisor, or other similar high level software that a boot firmware engine of the computing system 100 turns control of the computing system 100 to.

In some examples, the management system 106, e.g. BMC, can be used to implement services for the computing system 100. As examples, the management system 106 may provide "out-of-band" services, such as remote console access, remote reboot and power management functionality, monitoring health of the system, access to system logs, managing security of the computing system 100 and the like. In some examples, the management system 106 can collect and store log records in an audit log repository, for example, log information associated with health, status change of the computing system 100 or authentication failure events. The audit log repository may be hosted in the management system 106. The management system 106 may also be capable to reboot or power cycle the computing system 100. As noted, the management system 106 allows for remote management of the computing system 100, as such, notifications can be made to a centralized station using the management system 106.

The management system 106 may manage and monitor security of the computing system 100 by enabling integrity, confidentiality, availability, authentication, authorization, and/or accountability of the computing system 100. In an example, the management system 106 may setup various processes as per security policies and specifications, and implement such processes. A user may be permitted or restricted to access the management system 106, perform various operations in the management system 106 or both. For example, an authorized user may have permissions to access the management system 106. Further, an authorized user may have role based access to the management system 106. For example, an authorized user with low privileges may not be permitted to perform privileged operations e.g., security sensitive operations on the management system 106. In an example, an authorized user (e.g., administrator) with high privilege may have permissions to perform privileged operations.

In an example, an authorized user may be provided credentials (e.g., user identification and password) to access and/or perform operations on the management system 106. The management system 106 may further be used to implement an authentication process through an authentication system 108, to be followed by an authorized user every time the authorized user accesses the management system 106. In an example, the authentication process may have a first set of actions in a sequence, to be performed. The authentication process may require the authorized user to follow the first set of actions in the sequence and/or provide the credentials for accessing (e.g., a login operation) the management system 106.

In addition, a plurality of operations may be performed on the management system 106 to enable out-of-band management of the computing system 100. Examples of such operations may include power on, power off, clear audit logs, user management, security configuration etc. The plurality of operations may include a set of security sensitive operations. As used herein, the term "security sensitive operation" may refer to an operation that may be performed on a management system e.g., the management system 106, which may impact its confidentiality, integrity, availability, authentication, authorization, and/or accountability. Examples of the security sensitive operations performed on the management system 106 may include operations related to adding a new user (that may include providing authorization to the new user to access the management system 106), changing security configuration of the management system 106, changing password policies, or the like.

As discussed above, in order to perform an operation on the management system 106, the operation may be invoked by an authorized user. To invoke the operation, the authorized user may have to first perform the authentication process via the authentication system 108 to access the management system 106. As noted, the authentication process may include the first set of actions related to the authentication process. In an example, the milestone actions (in sequence according to time stamps) in the first set of actions may form the first set of milestone actions. Following the authentication process, the authorized user may have to perform an invocation process to invoke the operation on the management system 106. In some examples, the invocation process may include a second set of actions to invoke the operation on the management system 106. In an example, the milestone actions (in sequence according to time stamps) in the second set of actions may form the second set of milestone actions.

In some scenarios, as described above, an unauthorized user (or hacker) may bypass the authentication process by exploiting a vulnerability (e.g., buffer overflow) and manage to invoke an operation to perform the operation on the management system 106. In some other scenarios, an authorized user with low privileges may perform the authentication process through the authentication system 108, and may manage to perform privileged operations exploiting vulnerabilities in the management system 106. Such scenarios may be considered as anomalies during the invocation of the operation on the management system 106. In the examples described herein, the intrusion detection functionality may determine such anomalies to detect a security intrusion in the management system 106.

In the examples described herein, the management system 106 may include the intrusion detection engine 110 that provides the intrusion detection functionality. That is, the intrusion detection engine 110 may be capable of detecting a security intrusion in the management system 106. In an example, the intrusion detection engine 110 may be capable of detecting the security intrusion on a real-time basis. The security intrusion may be detected before the operation is committed on the management system 106 to prevent a security attack. The intrusion detection functionality of the intrusion detection engine 110 may be described in detail with reference to the FIGS. 1-4.

Engines, e.g., the intrusion detection engines 110 and the authentication engine 108 may include any combination of hardware and programming to implement the functionalities of the engines described herein. In examples described herein, such combinations of hardware and software may be implemented in a number of different ways. For example, the programming for the engines may be processor executable instructions stored on at least one machine-readable storage medium (e.g., a non-transitory machine-readable storage medium) and the hardware for the engines may include at least one processor to execute those instructions. In some examples, the hardware may also include other electronic circuitry to at least partially implement at least one the intrusion detection engine 110 or the authentication engine 108. In some examples, the at least one machine-readable storage medium may store instructions that, when executed by the at least one processor, at least partially implement one or both the intrusion detection engine 110 and the authentication engine 108. In such examples, the management system 106 may include the at least one machine-readable storage medium storing the instructions and the at least one processor to execute the instructions.

In examples described herein, the management system 106 may further include a secure log store 112 and a rule-set 114. The secure log store 112 may be hosted in the at least one machine-readable storage medium. In an example, the secure log store 112 may be hosted in Random Access Memory (RAM). The secure log store 112 may be capable of storing a plurality of log records generated corresponding to a plurality of milestone actions performed during invocation of an operation on the management system 106. In some examples, the plurality of log records may include audit log records and trace log records corresponding to a plurality of milestone actions performed during invocation of an operation on the management system 106. In an example, each of the log records may include information related to the corresponding milestone action performed during invocation of the operation, with a time stamp and user identifier. In some examples, the plurality of log records corresponding to the operation may include a first information related the first set of milestone actions performed during the authentication process and a second information related to the second set of milestone actions performed during the invocation process the operation. In an example, the first information may include information related to the user, such as identification/session identifier of the authorized user etc. In an example, the second information may include information related to the operation that is invoked on the management system 106. For example, the second information may include information identifying whether the operation is a security sensitive operation (as described above). In some examples, the information related to the operation such as adding a new user, changing security configuration of the management system 106, changing password policies, and the like may be included in the second information.

As noted, in some examples, the secure log store 112 may be hosted in RAM of the management system 106, for easily, fast and real-time access by the intrusion detection engine 110 for monitoring and analyzing the plurality of log records. In some examples, the secure log store 112 may be protected by a hardware based technology e.g., Secure Guard Extensions (SGX) such that the access to the secure log store 112 may restricted. In some examples, the secure log store 112 may be encrypted, which may be decrypted by the intrusion detection engine 110 using encryption algorithms like AES 128 or AES 256.

The rule-set 114, as described in examples herein, may be defined in the at least one machine-readable storage medium in the management system 106. The rule-set 114 may include one or more standard set of milestone actions that may be followed during invocation of an operation on the management system 106. As used herein, the term "standard set of milestone actions" may refer to a predefined set of milestone actions, identified using multiple log records, to be performed in a well-defined order by an authorized user. While invoking an operation, a deviation from the rule-set 114 may not be permitted for an authorized user. Such a deviation may be an anomaly in the invocation of the respective operation. In an example, the rule-set 114 may include a first rule-set including a first standard set of milestone actions related to the authentication process to access the management system 106 and a second rule-set including a second standard set of milestone actions related to the invocation process for each security sensitive operation of the set of the plurality of operations. In an example, the first standard set of milestone actions in the rule-set 114 corresponding to the authentication process to access the management system 106, may include actions such as entry to the main authentication process, verification of the user name, verification of the password, generating a session identifier to the user, an action indicating the successful validation of the user, in order. In an example, the second standard set of milestone actions in the rule-set 114 corresponding to the invocation process for an operation of 'adding new user' may include actions such as checking the authorization level of the user invoking the operation, input validation, changing the state of the system to add the new user.

In some examples, the intrusion detection engine 110 may perform various actions to provide intrusion detection functionality to detect a security intrusion in the management system 106, in accordance with some aspects of the present disclosure. In an example, intrusion detection engine 110 may provide real-time detection of a security intrusion in the management system 106.

In an example, the intrusion detection engine 110 may store a plurality of log records in the secure log store 112. In some examples, the secure log store 112 is separate from the audit log repository. The plurality of log records may be generated corresponding to a plurality of milestone actions performed during invocation of an operation on the management system 106. In some examples, the plurality of log records may include audit log records and trace log records corresponding to the plurality of milestone actions performed during invocation of the operation on the management system 106. In some examples, the intrusion detection engine 110 may receive the plurality of log stores from the management system 106 to store them in the secure log store 112. In some examples, the plurality the log records may be stored in the secure log store 112 using standard libraries, well defined network interfaces using TCP/IP (Transmission Control Protocol/Internet Protocol) connections, in-band interfaces like IPMI (Intelligent Platform Management Interface) or the like. As noted, the secure log store 112 may be stored in RAM of the machine-readable storage medium for fast and easy access by the intrusion detection engine 110.

The intrusion detection engine 110 may monitor the plurality of records stored in the secure log store 112. In an example, the intrusion detection engine 110 may perform real-time monitoring of the plurality of records as the intrusion detection engine 110 can access the secure log store 112 in RAM, easily and on a real-time basis. Monitoring the plurality of log records corresponding to the invocation of the operation may include monitoring the first information including the first set of milestone actions performed during the authentication process and the second information including the second set of milestone actions performed during the invocation process of the operation.

In response of monitoring the plurality of log records in the secure log store 112, the intrusion detection engine 110 may identify whether the operation is a security sensitive operation. In some examples, the intrusion detection engine 110 may identify more than one security sensitive operation by monitoring various sets of plurality of log records in the secure log store 112 corresponding a plurality of operations invoked on the management system 106.

On identifying the invocation of the security sensitive operation, the intrusion detection engine 110 may analyze the plurality of log records for an identified operation for example, the identified security sensitive operation, based on the rule-set 114. In some examples, the intrusion detection engine 110 may analyze the plurality of log records by determining whether the plurality of log records follow the rule-set 114. In some instances, the intrusion detection engine 110 may analyze the plurality of log records by comparing the first information including the first set of milestone actions performed during the authentication process to the first standard set of milestone actions defined in first rule-set of the rule-set 114 and the second information including the second set of milestone actions performed during the invocation process to the second standard set of milestone actions defined in the second rule-set of the rule-set 114. In such examples, the intrusion detection engine 110 may analyze the plurality of log records by determining whether the first set of milestone actions performed during the authentication process follows the first standard set of milestone actions defined in the first rule-set of the rule-set 114 and the second set of milestone actions performed for the invocation process follows the second standard set of milestone actions defined in the second rule-set of the rule-set 114.

As noted, in an example, the first standard set of milestone actions in the rule-set 114 corresponding to the authentication process to access the management system 106, may include actions such as entry to the main authentication process, verification of the user name, verification of the password, generating a session identifier to the user, an action indicating the successful validation of the user, in order. In a scenario, when buffer over flow vulnerability is exploited in the management system 106, an unauthorized user could bypass one or more of the user name verification or the password verification and generate a valid session identifier. In such scenario, the first set of log records corresponding to the authentication process does not follow the first rule-set in the rule-set 114, and hence indicates a security intrusion.

In some examples, during invocation of an operation 'add new user', the plurality of milestone actions may include the first set of milestone actions for the authentication process and the second set of milestone actions for the 'add new user' operation, which includes checking the authorization level of the user invoking the operation, input validation, changing the state of the system to add the new user. In a scenario, an unauthorized user can perform 'add new user' operation on the management system 106 by bypassing the authentication process and invoking the state change code using carefully crafted input, exploiting e.g., the buffer overflow vulnerabilities. In this scenario, since the authentication is bypassed, the plurality of log records generated on the management system may not have user identifier (who invokes the operation) and other milestone actions associated with a proper authentication operation. At least one of the first set of log records corresponding to the authentication process or the second set of log records corresponding to the invocation of 'add new user' operation does not follow the corresponding first rule-set or the second rule-set, which indicates a potential security intrusion.

In some examples, intrusion detection engine 110 may perform the analysis of the plurality of log records for the identified operation while or immediately after the completion of the invocation of the identified operation on the management system 106. In certain examples, the plurality of log records may be analyzed immediately before or while performing a last milestone action of the second set of milestone actions for invoking the identified operation. In some examples, the intrusion detection engine 110 may analyze the plurality of log records while the last milestone action of the second set of milestone actions is being performed for invoking the operation on the management system 106.

In some examples of the present disclosure, in response to analyzing that the plurality of log records corresponding to the operation do not follow the first rule-set, the corresponding second rule-set, or both the first rule-set and the second rule-set, the intrusion detection engine 110 may detect a security intrusion in the management system 106.

In response to detecting the security intrusion in the management system 106, the intrusion detection engine 110 may perform a security action. The security action may be performed to recover the management system before being committed on the management system 106. In some examples, the intrusion detection engine 110 may perform a recovery action on the management system 106. A recovery action may include resetting the management system 106, failing the invocation of the operation with appropriate logs or rollback of the actions and system state performed during the invocation of the operation. In some examples, the intrusion detection engine 110 may automatically perform the recovery action. In an example, the intrusion detection engine 110 may generate an alert to enable the recovery action on the management system 106. In these examples, the recovery action may be enabled by a preconfigured remote center such as a security operation center. Furthermore, in some examples, the intrusion detection engine 110 may send an alert to a logged-in administrator, i.e., an administrator who is logged-in into the management system 106 at an instant. The administrator can take recovery actions like revoking the invocation of the operation or shutting down the management system 106 or the computing system 100.

The security action may be performed immediately after detecting the security intrusion to recover the management system before the operation is committed on the management system 106. That is, the intrusion detection engine 110 may perform the security action before committing the operation on the management system 106. Performing the security action prior to initiating the operation on the management system 106 would, advantageously, help in preventing a security attack on the management system 106. In some examples, in response to analyzing that the plurality of log records corresponding to the operation (that is invoked on the management system 106) follow the first rule-set and the corresponding second rule-set, the intrusion detection engine 110 may not detect a security intrusion. In such examples, intrusion detection engine 110 may not perform the security action. In these instances, the operation may be allowed on the management system 106.

Moreover, in some other examples, a plurality of other operations performed on the computing system 100 via CPU 102 may be monitored and analyzed to detect a security intrusion during invocation of an operation on the computing system 100, by the intrusion detection engine 110 implemented in the management system 106. In such examples, the plurality of other log records corresponding invocation of an operation on the computing system 100 via CPU 102 may be transferred to the secure log store 112 hosted in the management system 106. The plurality of other log records may be transferred to the secure log store by well-defined network interfaces using TCP/IP (Transmission Control Protocol/Internet Protocol) connections, in-band interfaces like IPMI (Intelligent Platform Management Interface) or the like. Further, the rule-set 114 may include another set of rule-set for a standard process of invocation of an operation on the computing system 100 via CPU 102. In such examples, the intrusion detection engine 110 may detect a security intrusion in the computing system 100 (separate from the management system 106) in a similar way as described above with reference to the management system 106.

Figure 2:
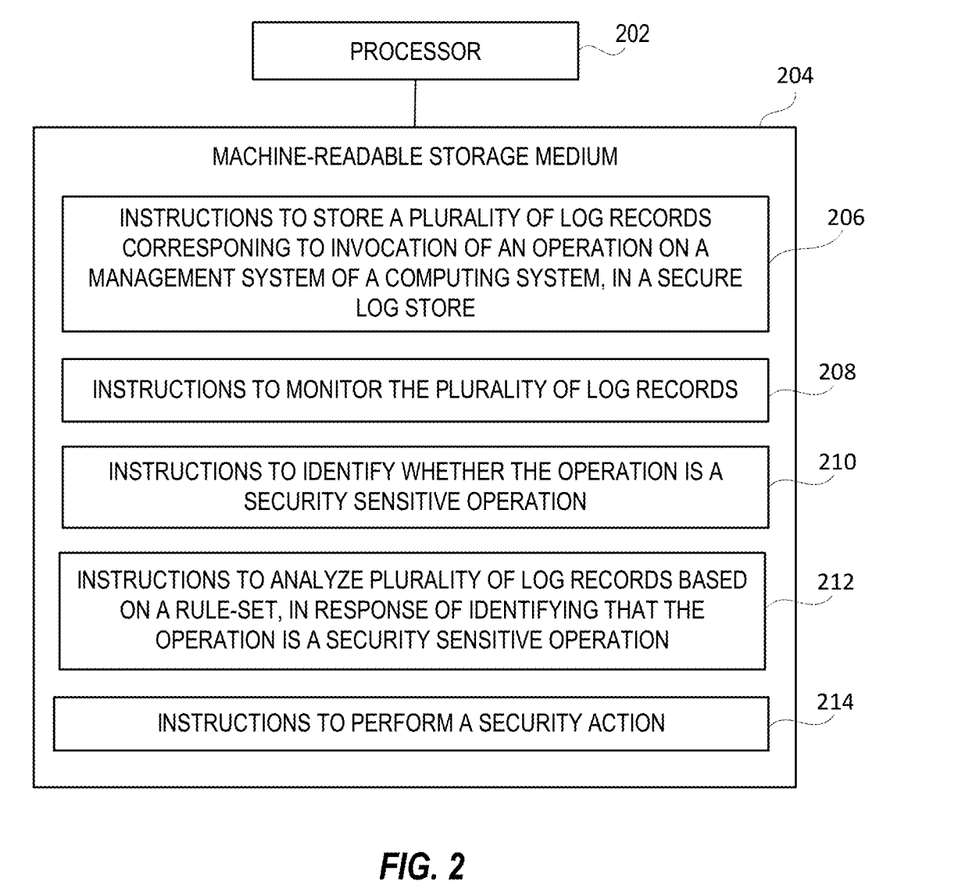
FIG. 2 is a block diagram depicting a processor and a machine-readable storage medium encoded with example instructions to detect a security intrusion in a management system of a computing system, in accordance with an example.

Referring now to FIG. 2, a block diagram 200 depicts a processor 202 and a machine-readable storage medium 204 encoded with example instructions to detect a security intrusion in a computing system, such as, the management system 106 of the computing system 100 (FIG. 1), in accordance with an example. The machine-readable storage medium 204 may be any electronic, magnetic, optical, or other physical storage device that may store data and/or execute instructions. In an example, the machine-readable storage medium 204 may be non-transitory and alternatively referred to as a non-transitory machine readable medium. In an example, the machine-readable medium storage medium 204 may be RAM. In some examples, the machine readable medium 204 may be accessed by the processing resource 202. The processing resource 202 and the non-transitory machine readable medium 204 may be implemented in a system, for example the intrusion detection engine 110.

The non-transitory machine-readable storage medium 204 may be encoded with executable instructions 206-214, in some examples. The instructions 206-214 may be executed by the processor 202 to implement various aspects of detecting a security intrusion in a computing system. In particular, the instructions 206-214 may be executed for performing the functionalities of the intrusion detection engine 110 and one or more methods, for example, the methods 300 and 400 described in FIGS. 3-4. In certain examples, as an alternative or in addition to retrieving and executing the instructions 206-214, the processor 202 may include at least one IC, other control logic, other electronic circuits, or combinations thereof that include a number of electronic components for performing the functionalities intended to be performed by the management system 106.

The instructions 206, when executed, may cause the processor 202 to store a plurality of log records generated corresponding to a plurality of milestone actions performed during invocation of an operation on the management system 106, in the secure log store 112. In some examples, the instructions 206 may further cause the processor 202 to receive the plurality of log records from the management system 106. Further, the instructions 208, when executed, may cause the processor 202 to monitor the plurality of log records stored in the secure log store 112. Furthermore, the instructions 210, when executed, may cause the processor 202 to identify whether the operation is a security sensitive operation. In response of identifying that the operation is the security sensitive operation, the instructions 212, when executed, may cause the processor 202 to analyze the plurality of log records (stored in the secure log store 112) based on the rule-set 114 to detect a security intrusion in the management system 106. In some examples, the instructions 212 to analyze may further include instructions to determine whether the plurality of log stores follow the rule-set 114. The process of such determination is described with reference to FIG. 1 and FIGS. 3 and 4. In response of detecting the security intrusion, the instructions 214, when executed, may cause the processor 202 to perform a security action (described above) to recover the management system before the operation is committed on the management system 106.

The instructions 206-214 may include various instructions to execute at least a part of the methods described in FIGS. 3-4 (described below). Also, although not shown in FIG. 2, the non-transitory machine readable medium 204 may also include additional instructions to perform various other method steps that may not be described in FIGS. 3-4.

Figure 3:
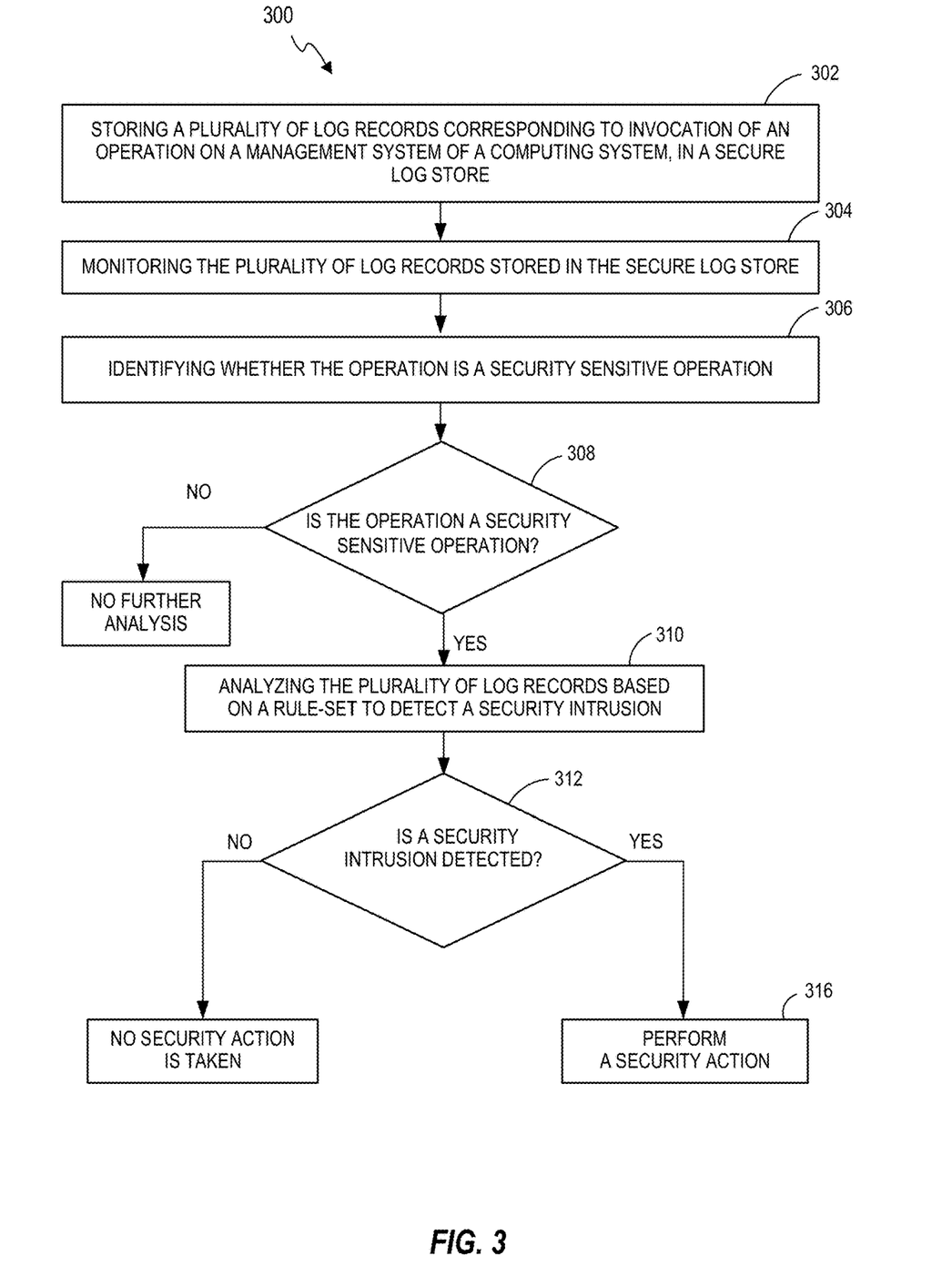
FIG. 3 is a flow chart for a method for detecting a security intrusion in a management system of a computer system, in accordance with an example.
Figure 4:
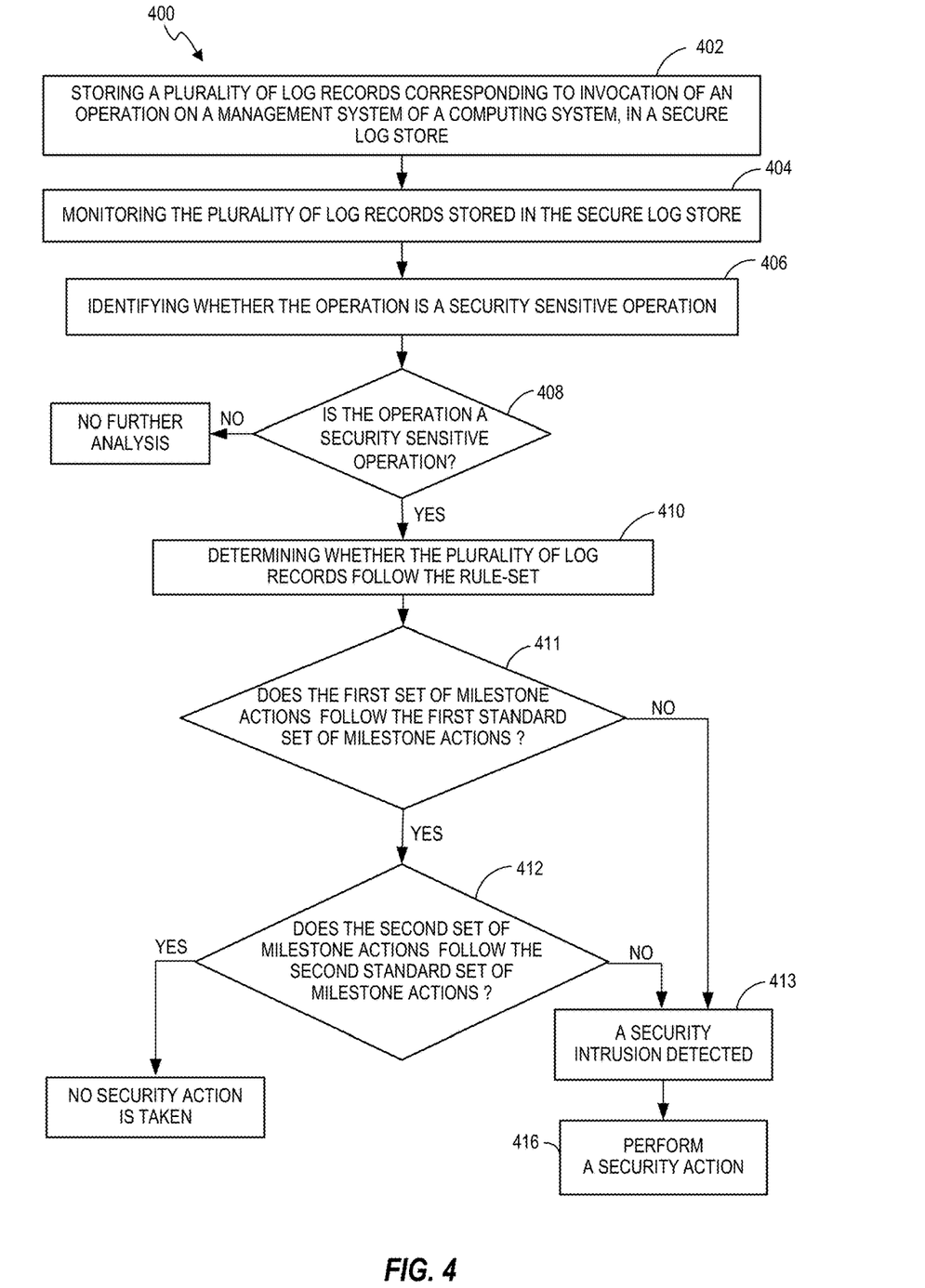
FIG. 4 is a flow chart for a method for detecting a security intrusion in a management system of a computer system, in accordance with another example.

FIGS. 3-4 depict flowcharts of example methods 300 and 400 for detecting a security intrusion in a computing system, in various examples. In some examples, the methods 300 and 400 may be performed by the intrusion detection engine 110. For ease of illustration, the execution of methods 300 and 400 are described with reference to FIG. 1. Although the below description is described with reference to the intrusion detection engine 110 of FIG. 1, however other applications or devices suitable for the execution of methods 300 and 400 may be utilized (e.g., the processor 202 and machine-readable storage medium 204 of FIG. 2). Additionally, implementation of methods 300 and 400 is not limited to such examples. Although the flowcharts of FIGS. 3-4, individually, show a specific order of performance of certain functionalities, methods 300 and 400 are not limited to such order. For example, the functionalities shown in succession in the flowcharts may be performed in a different order, may be executed concurrently or with partial concurrence, or a combination thereof.

Referring now to FIG. 3, a flow diagram depicting a method 300 for detecting a security intrusion in computing system e.g., the management system 106 of the computing system 100 (FIG. 1) is presented, in accordance with an example. The method 300 will be described in conjunction with the computing system 100 of FIG. 1. As will be appreciated, method steps represented by blocks 302, 304, 306, 308, 310, 312 and 316 (hereinafter collectively referred to as 302-316) may be performed by the intrusion detection engine 110. In particular, method at each such method blocks 302-316 may be executed by the processor 202 by executing the instructions 206-214 stored in the non-transitory machine-readable storage medium 204.

At block 302, the method 300 may include storing a plurality of log records in the secure log store 112. The plurality of log records may be generated corresponding to a plurality of milestone actions performed during invocation of an operation on the management system 106. In the examples described herein, the secure log store 112 may be hosted in the management system 106. In an examples, the secure log store 112 may be stored in the machine-readable storage medium e.g., RAM of the management system 106 for easy and fast access. In some examples, storing the plurality of log records may include receiving the plurality of log records from the management system 106 and storing them in the secure log store 112. The storing the plurality of log records may include receiving audit log records and trace log records corresponding to the plurality of milestone actions performed during invocation of the operation on the management system 106 and storing in the secure log store 112. In an example, storing the plurality of log records may be performed on a real-time basis. In an example, storing the plurality of log records may be performed by the intrusion detection engine 110. In some examples, the method 300 may include storing multiple sets of a plurality of log records corresponding the invocation of each operation of the plurality of operations on the management system 106.

At block 304, the method 300 may include monitoring the plurality of log records stored in the secure log store 112. In an example, the plurality of log records may be monitored on a real-time basis. In an example, monitoring of the plurality of log records may be performed by the intrusion detection engine 110. In these instances, the intrusion detection engine 110 may access the plurality of log records stored in the secure log store 112 and monitor the plurality of log records.

Further, while or after monitoring the plurality of log records at block 304, the method 300, at block 306, may include identifying whether the operation (that has been invoked) is a security sensitive operation. In an example, a check may be performed by intrusion detection engine 110 while monitoring the plurality of log records, at block 304, to identify whether the operation is the security sensitive operation that belongs to the predefined set of the plurality of operations. The predefined set of the plurality of operations may include a plurality of security sensitive operations, e.g., adding a new user, changing security configuration or changing password policies. The operation may checked based on the second information of the plurality of log records. The second information may include information indicating the details of the operation that has been invoked on the management system 106. For example, the second information may include information related to adding a new user, changing security configuration or changing password policies in the management system 106.

In some instances, in response to performing the check during monitoring the plurality of log records, it may be identified that the operation may be a security sensitive operation ("YES" at block 308). In such instances, the method 300, at block 310, may include analyzing the plurality of log records based on the rule-set 114. In some examples, analyzing the plurality of log records may include determining whether the plurality of log records follow the rule-set 114 to detect a security intrusion into the management system 106. In some instances, in response to performing the check during monitoring the plurality of log records, it may be identified that the operation may not be a security sensitive operation ("NO" at block 308). In such instances, no further analysis may be performed to detect the security intrusion for the operation. In such instances, the operation may be allowed on the management system 106.

In some instances, in response of analyzing the plurality of log records at block 310, the method 300, at block 312, may detect a security intrusion into the management system 106 ("YES" at block 312). In such instances, the method 300, at block 316, may include performing a security action (as described above). In some instances, in response of analyzing the plurality of log records, at block 310, the method 300, at block 312, may not detect a security intrusion into the management system 106 ("NO" at block 312). In such instances, no security action would be taken on the management system 106. In these instances, the operation may be allowed on the management system 106.

Turning now to FIG. 4, a flow diagram depicting a detailed method 400 for detecting a security intrusion in the management system 106 is presented, in accordance with some examples. The method 400 is described in conjunction with FIG. 1. Further, the method 400 of FIG. 4 includes certain blocks that are similar to one or more blocks described in FIG. 3, details of which are not repeated herein for the sake of brevity. By way of example, the blocks 402, 404, 406, 408, 414, and 416 of FIG. 4 are similar to blocks 302, 304, 306, 308, 314, and 316, respectively, of FIG. 3. Also, method steps at various blocks depicted in FIG. 4 may be performed by the intrusion detection engine 110. In particular, method at each such method blocks may be executed by the processor 202 by executing the instructions 206-214 stored in the non-transitory machine-readable storage medium 204.

At block 402, the method 400 may include storing a plurality of log records in the secure log store 112. The plurality of log records may be generated corresponding to a plurality of milestone actions performed during invocation of an operation on the management system 106.

At block 404, the plurality of log records may be monitored and, at block 406, the method 400 may identify whether the operation is a security sensitive operation. In some instances when the operation may not be a security sensitive operation ("NO" at block 408), no further analysis may be performed to detect the security intrusion for the operation. In these instances, the operation may be allowed on the management system 106.

In some instances when the operation may be a security sensitive operation ("YES" at block 408), the method 400, at block 410, may include determining whether the plurality of log records follow the rule-set 114. In these instances, a check may be performed to determine whether the first set of milestone actions performed during the authentication process follows the first standard set of milestone actions defined in the first rule-set of the rule-set 114. In some instances, the first set of milestone actions does not follow the first standard set of milestone actions ("NO" at block 411). In these instances, a security intrusion is detected at block 413.

The method 400, at block 416, may include performing a security action. The security action may be performed to recover the management system before being committed on the management system 106. In some examples, the method 400, at block 416, may include performing a recovery action for recovering the operation from the management system 106. A recovery action may include resetting the management system 106, failing the invocation of the operation with appropriate logs or rollback of the actions and system state performed during the invocation of the operation. In some examples, the recovery action may be automatically performed by the intrusion detection engine 110. In some examples, the method 400, at block 416, may include generating an alert to enable the recovery action on the management system 106. In these examples, the recovery action may be enabled by a preconfigured remote center such as a security operation center. Furthermore, in some examples, the method 400, at block 416 may include sending an alert to a logged-in administrator, i.e., an administrator who is logged-in into the management system 106 at an instant. The administrator can take recovery actions like revoking the invocation of the operation or shutting down the management system 106 or the computing system 100. Some more details of performing the security action may be described above.

In some instances, at block 411, the first set of milestone actions follows the first standard set of milestone actions ("YES" at block 411). In these instances, another check may be performed to determine whether the second set of milestone actions performed during the invocation process of the operation follows the second standard set of milestone actions in the second rule-set of the rule-set 114. In some instances, the second set of milestone actions does not follow the second standard set of milestone actions ("NO" at block 412). In these instances, a security intrusion is detected at block 413, and the method 300, at block 416, may include performing the security action (as described above). In some instances, the second set of milestone actions follows the second standard set of milestone actions ("YES" at block 412). In these instances, no security intrusion is detected. In these instances, the security action is not taken. In these instances, the operation may be allowed on the management system 106.

It should be understood that the above-described examples of the present solution is for the purpose of illustration only. Although the solution has been described in conjunction with a specific example thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The invention claimed is:

1. A method comprising:
    storing a plurality of log records, by a first processor of a management system of a computing system, in a secure log store hosted in the management system, wherein the plurality of log records are generated corresponding to a plurality of milestone actions performed during invocation of an operation on the management system, wherein the computing system comprises a second processor separate from the first processor to execute an operating system of the computing system, the first processor to monitor and manage the computing system, the invocation of the operation comprises an authentication process to access the management system, the plurality of log records representing a first plurality of actions of the authentication process and a first order of the first plurality of actions, and a given action of the first plurality of actions comprises generating a session identifier;
    monitoring, by the first processor, the plurality of log records stored in the secure log store;
    identifying, by the first processor, whether the operation is a security sensitive operation, wherein the security sensitive operation belongs to a predefined set of a plurality of operations that are performed on the management system;
    in response of identifying that the operation is the security sensitive operation, analyzing, by the first processor, the plurality of log records based on a rule-set defined in the management system to detect a security intrusion in the management system, wherein the rule-set comprises a second plurality of actions for the authentication process and a second order for the authentication process, and the analyzing comprises comparing the second plurality of actions and the second order to the first plurality of actions and the first order; and
    performing a security action, by the first processor, in response of detecting the security intrusion.

2. The method of claim 1, wherein storing the plurality of log records further comprises receiving, by the first processor, the plurality of log records from the management system.

3. The method of claim 1, wherein the secure log store is separate from an audit log repository of the management system.

4. The method of claim 1, wherein the security sensitive operation comprises one or more of operations related to adding a new user, changing security configuration of the computing system or changing password policies in the management system.

5. The method of claim 1, wherein the plurality of log records comprises:
    a first set of log records corresponding to a first set of the plurality of milestone actions, performed during the authentication process.

6. The method of claim 1, wherein the rule-set comprises:
    a first rule-set comprising a first standard set of milestone actions related to the authentication process.

7. The method of claim 1, wherein the analyzing further comprises determining whether the first plurality of actions follow the second plurality of actions and determining whether the first order follows the second order.

8. The method of claim 7, wherein the analyzing further comprises detecting the security intrusion in response to the first plurality of actions being different than the second plurality of actions, or the first order being different than the second order.

9. The method of claim 1, wherein the analyzing is performed while or immediately after completing the invocation of the operation on the management system.

10. The method of claim 1, wherein the performing of the security action comprises generating an alert to enable a recovery action to recover the management system before the operation is committed on the management system.

11. The method of claim 1, wherein the performing of the security action comprises performing a recovery action, by the first processor, to recover the management system before the operation is committed on the management system.

12. The method of claim 1, wherein the performing of the security action comprises alerting a logged-in administrator at an instant to recover the management system before the operation is committed on the management system.

13. The method of claim 1, wherein the management system comprises a baseboard management controller of the computing system, and the baseboard management controller comprises the first processor.

14. The method of claim 1, wherein the secure log store is protected using a security control.

15. A non-transitory machine-readable storage medium encoded with instructions executable by a first processor of a management system of a computing system, wherein the computing system comprises a second processor separate from the first processor to execute an operating system of the computing system, the first processor to manage and monitor the computing system, and the instructions, when executed by the first processor, cause the first processor to:
    store a plurality of log records in a secure log store hosted in the management system;
    wherein the plurality of log records are generated corresponding to a plurality of milestone actions performed during invocation of an operation on the management system, the invocation of the operation comprises an authentication process to access the management system, and the invocation of the operation comprises an invocation process to invoke the operation on the management system;
    monitor the plurality of log records stored in the secure log store;
    identify whether the operation is a security sensitive operation that belongs to a predefined set of a plurality of operations that are performed on the management system;
    in response to identifying that the operation is the security sensitive operation, analyze the plurality of log records based on a rule-set defined in the management system to detect a security intrusion in the management system, wherein the rule-set comprises a first plurality of actions and an order for the first plurality of actions for the authentication process, the rule-set comprises a second plurality of actions and an order for the second plurality of actions for the invocation process, and analyzing the plurality of log records comprises:

detecting, based on the rule-set and the plurality of log records, an anomaly in at least one of the authentication process or the invocation process; and responsive to detecting the anomaly, detecting the security intrusion; and perform a security action in response of detecting the security intrusion.

16. The non-transitory machine-readable storage medium of claim 15, wherein the instructions, when executed by the first processor, further cause the first processor to receive the plurality of log records from the management system.

17. The non-transitory machine-readable storage medium of claim 15, wherein the instructions, when executed by the first processor, further cause the processor to detect, based on the rule-set and the plurality of log records, an authentication bypass.

18. A computing system comprising:
at least one central processing unit to execute an operating system;
a memory; and
an intrusion detection engine that is separate from the at least one central processing unit, the intrusion detection engine comprising:
a non-transitory machine-readable storage medium encoded with instructions executable by a processor separate from the at least one central processing unit to manage and monitor the computing system as part of a management system of the computing system, wherein the instructions, when executed by the processor, cause the processor to:
receive a plurality of log records generated corresponding to a plurality of milestone actions performed during invocation of an operation on a management system of the computing system, wherein the invocation of the operation comprises an authentication process to access the management system, the plurality of log records representing a first plurality of actions of the authentication process and a first order of the first plurality of actions, and a given action of the first plurality of actions comprises generating a session identifier;

store the plurality of log records in a secure log store hosted in a management system of the computing system, wherein the secure log store is separate from a log repository of the management system; and monitor the plurality of log records stored in the secure log store;

identify whether the operation is a security sensitive operation that belongs to a predefined set of a plurality of operations that are performed on the management system;

in response of identifying that the operation is the security sensitive operation, analyze the plurality of log records based on a rule-set defined in the management system to detect a security intrusion in the management system, wherein the rule-set comprises a second plurality of actions for the authentication process and a second order for the authentication process, and the analyzing comprises comparing the second plurality of actions and the second order to the first plurality of actions and the first order; and perform a security action in response of detecting the security intrusion.

19. The computing system of claim 18, wherein the management system comprises a baseboard management controller of the computing system, and the baseboard management controller comprises the processor.

20. The computing system of claim 18, wherein the instructions further comprises instructions executable by the processor to cause the processor to:
receive another plurality of log records generated corresponding to another plurality of milestone actions performed during invocation of an operation on the computing system via the at least one central processing unit.

* * * * *